United States Patent [19]
Fuchs et al.

[11] Patent Number: 5,738,895
[45] Date of Patent: Apr. 14, 1998

[54] METHOD AND APPARATUS FOR PRODUCING A MOLDED ICE CREAM PRODUCT

[75] Inventors: Christof Fuchs, Heppenheim; Gordon Hall, Weinheim, both of Germany

[73] Assignee: Good Humor-Breyers Ice Cream, Division of Conopco, Inc., Green Bay, Wis.

[21] Appl. No.: 595,124

[22] Filed: Apr. 15, 1996

[30] Foreign Application Priority Data

Feb. 3, 1995 [EP] European Pat. Off. ............... 95101514

[51] Int. Cl.⁶ .................................. A23G 9/00; A23P 1/00
[52] U.S. Cl. ................... 426/515; 425/126.2; 425/129.1; 426/134
[58] Field of Search ...................... 426/249, 134, 426/512, 515; 99/455; 425/126.2, 129.1, 574; 264/275

[56] References Cited

U.S. PATENT DOCUMENTS

| 4,381,908 | 5/1983 | Roth | 264/275 |
|---|---|---|---|
| 4,746,523 | 5/1988 | Binley | 426/515 |

FOREIGN PATENT DOCUMENTS

| 0201141 | 12/1989 | European Pat. Off. . |
|---|---|---|
| 1156359 | 6/1969 | United Kingdom . |

Primary Examiner—George Yeung
Attorney, Agent, or Firm—James J. Farrell; Milton L. Honig

[57] ABSTRACT

A method for producing an ice cream product is provided involving the steps of: introducing at least one stick into a cavity of a mold for shaping the ice cream product, introducing ice cream under pressure into the cavity, releasing the pressure and then removing the shaped ice cream from the cavity. Sticks are supported within the cavity at least during introduction of the ice cream. Further, the invention also relates to an apparatus including: an injection device having a chamber with feeding mechanism for holding starting material, a mechanism for inserting pressure upon the starting material and an outlet for delivering pressurized starting material and a mold. The mold in the closed position includes a mold cavity to be filled with starting material through an intake opening by means of an outlet on the injection device, at least one stick introduction opening and air vents. The mold is provided with a supporting mechanism to hold sticks within the mold cavity. The method and apparatus prevent formation of hollow spots in the produced ice cream products while maintaining production speed and preventing stick damage.

21 Claims, 2 Drawing Sheets

METHOD AND APPARATUS FOR PRODUCING A MOLDED ICE CREAM PRODUCT

BACKGROUND OF THE INVENTION

1. Field of the Invention

The present invention relates to the production of ice cream products, and in particular to a method and an apparatus for conducting the method, which are suitable for the production of ice cream products of complex shapes.

2. The Related Art

Such a method and such an apparatus, respectively are described in EP 0 201 141 B1, the total contents of which is part of the disclosure of the present invention by reference. In order to elucidate the starting point of the present invention, a typical mould as used in the known method or in the known apparatus for shaping an ice cream product will shortly be explained in the following, referring to the attached FIG. 1. As shown in FIG. 1, the known mould comprises an upper mould half 7A and a lower mould half 7B which enclose, when in closed condition, a cavity 8. The closed mould 7A, 7B is provided with an intake opening 6, 9 which is connected by means of a conically narrowing conduit with the cavity 8. The upper mould half 7A is provided with a stick insert opening which is made in the form of a straight slit 10 for accepting and inserting an ice cream stick into the interior of the mould cavity. For the mutual adjustment of the upper half 7A and the lower half 7B, the lower half 7B is provided with centering pins 12 which engage into respective associated openings 13 in the upper mould half 7A when the mould is closed. Connection pieces 15 for conducting a heating medium are provided at the mould halves, said medium is fed to the mould halves in order to heat the mould. At the intake opening 6, 9 of the mould 7A, 7B generally an injection device (not shown in FIG. 1) is set on by means of which an ice cream or a water-ice mixture respectively is injected under pressure into the mould cavity 8.

The ice cream entering the mould cavity 8 hits necessarily the stick 20 (shown by a dash line in FIG. 1) projecting into the mould cavity. This exerts relatively high forces upon the stick 20 due to the inflowing ice cream since the pressure of the injected ice cream is relatively high in order to quickly and completely fill the mould cavity. Due to the exerted forces the stick tends to more or less deflect or bend, which may have the consequence that the stick breaks or splinters or bends so that the stick itself is visible within the ice cream body after the moulded ice cream product is taken out of the mould.

Also the stick bent by the force of the entering ice cream may prevent the mould cavity from being completely filled so that an ice cream-free spot or a defective area of the moulded ice cream body may result.

It is therefore an object of the present invention to provide a method or an apparatus for producing ice cream products which with certainty prevent the formation of a hollow spot in the produced ice cream products due the above explained problems, without reducing the production speed of the ice cream production.

SUMMARY OF THE INVENTION

During the method according to the invention at first a stick is entered into a cavity of a mould for moulding the respective ice cream product. Thereupon an ice cream, that preferably contains separate ice particles or ice pieces and a continuous liquid phase in such relative quantities that the ice cream retains its shape without further support, is introduced or injected under pressure into the cavity, said mould being closed with the exception of venting openings. After reduction of the pressure then the thus formed ice cream product is taken out of the mould or the cavity. The method according to the invention is distinguished in that the stick projecting into the mould cavity is advantageously supported within the cavity preventing thus an disadvantageous deflection or bending of the stick within said cavity during the filling of the cavity with the ice cream.

The method according to the invention is applicable also in case of a plurality of sticks being present within the mould cavity, which, as a rule, are clamped into the mould wall. In accordance with the invention, each of said sticks will be supported or held within the interior of the mould cavity in addition to being supported or clamped in the mould wall in order to prevent a disadvantageous bending of the sticks.

The support or bearing of the respective stick within the said mould cavity may be provided at least at one spot of the respective stick so that a mutual neutralization of the torques acting on the respective stick is attained, said torques being produced in the respective stick during the introduction of the ice cream under pressure.

"Stick" in this context does not refer only to the typical ice cream stick but to generally each and every device by means of which the ice product may be held, so e.g. also a rod, a cord, a plate or the like.

Depending on the kind or type and the form of the said stick, depending on the used material of the stick, be it wood or plastic etc., and depending on the dimensions of the said stick and the pressure conditions prevailing during the injection of the ice cream within the said mould cavity, and depending on the location of injection of the ice cream into the cavity, the respective stick may be supported at one spot or also at a plurality of spots or locations, so that the bending of the stick is prevented.

The bearing of the said stick may be e.g. a pin which projects into the mould cavity and upon which the stick lies at the determined bearing spot. The partly frozen ice cream in that case is preferably injected into the cavity in a direction opposite to the pin point of the pin, the stick laying on the pin point.

Since often longitudinal, approximately one-finger-wide ice sticks of a relatively thin cross section are used in the production of ice cream products, it may be advantageous, depending on the length of the said stick, not only to support the stick at one or a plurality of spots at the lower side of the said stick, but to provide also a bearing at the upper side of the stick. Even a lateral bearing of the stick or the sticks within the mould cavity may be applied.

The pin for supporting the stick may be shaped, seen in direction of the stick, conically tapering to a point in order to be able to take the ice cream product easily out of the mould. The generally cylindric pin may be detachably placed at the inside of the mould wall, i.e. removably placed.

The injection of the ice cream may generally be effected at any arbitrary location into the cavity.

The apparatus according to the invention for producing ice cream products from a starting material such as an ice cream comprises an injection device which is provided with a chamber with feeding means for the starting material, means for exerting a pressure upon said starting material in the chamber, and outlet means for feeding the pressurized starting material, a mould which, when in closed condition, has a cavity which is filled through an intake opening from the outlet means of the injection device with the starting material, at least one stick insertion opening for inserting a stick into the mould cavity, and vent openings, and supporting means which support the stick or each one of the sticks within said mould cavity.

The supporting means may consist of one pin or a plurality of pins which project into the said mould cavity for bearing the stick or the sticks respectively. But also rib-shaped parts, webs or the like may be used as support members in accordance with the particular case, which ensure an effective bearing of the stick within the mould cavity.

The intake opening of the mould may be located at any location of the mould so that it will be possible to realize, in cooperation with the injection opening set on the intake opening, an associated injection direction for the ice cream into the cavity. Thereby e.g. an injection direction may be determined which is perpendicular with respect to the longitudinal extension of the stick within the mould cavity.

BRIEF DESCRIPTION OF THE DRAWING

Various advantages and features will become evident from the following description of an embodiment of the present invention in connection with the attached drawings, in which.

DETAILED DESCRIPTION OF THE INVENTION

Figure 1:
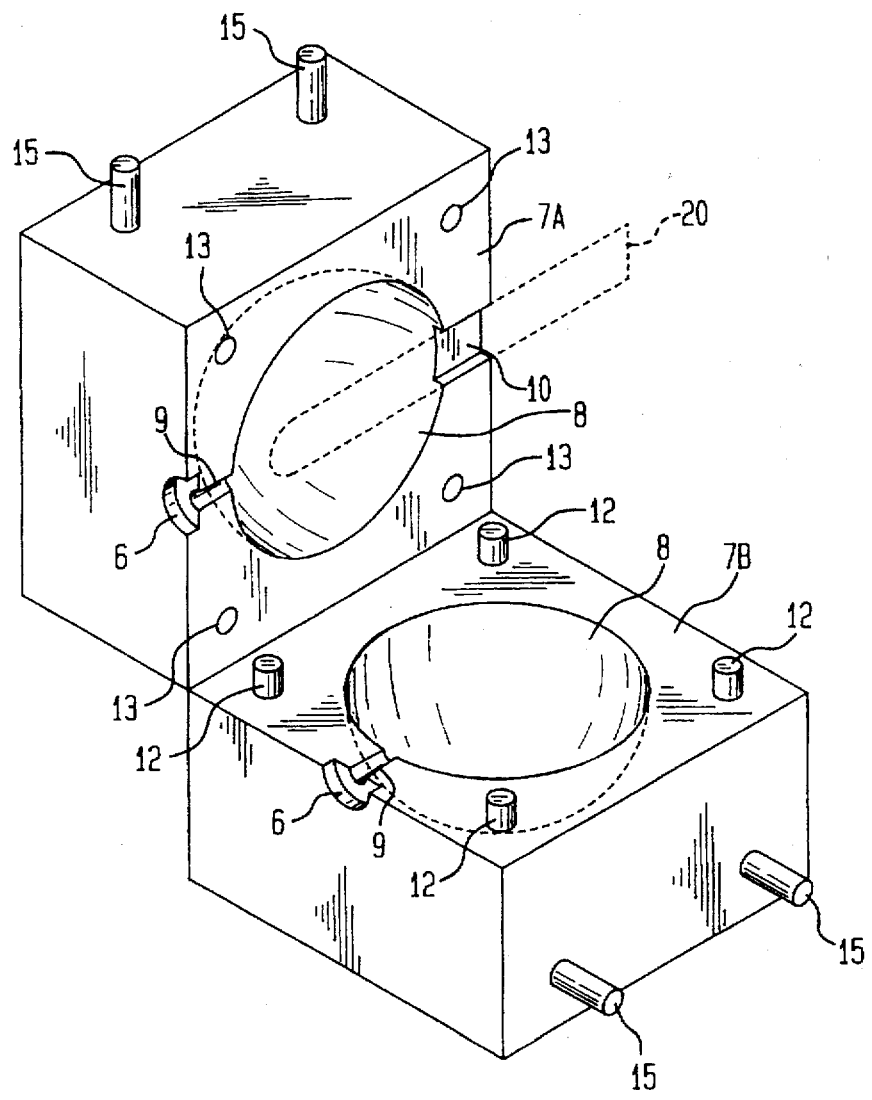
FIG. 1 shows a mould consisting of two mould halves as used in a method and an apparatus in accordance with the prior art.

FIG. 1 shows a mould as used in prior art. Such mould consists of an upper mould half 7A and a lower mould half 7B, the further particularities of which having been already extensively explained in the above introduction.

Figure 2:
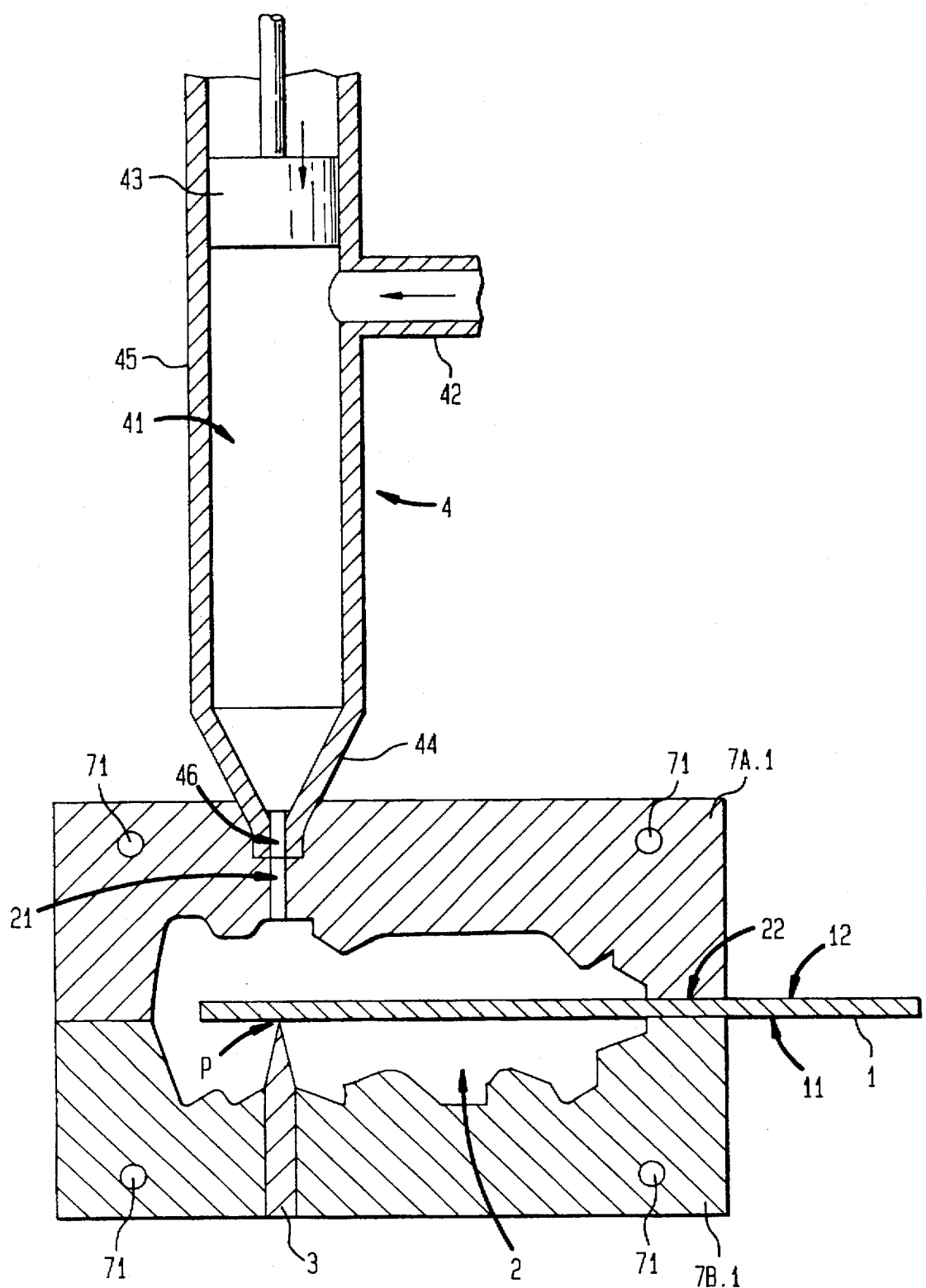
FIG. 2 shows a partially schematic sectional view showing an apparatus being equipped with an injection device and a mould in accordance with an embodiment of the present invention.

The apparatus in accordance with the invention as shown in FIG. 2 comprises essentially an injection device 4 and a mould 7A.1, 7B.1 consisting of an upper mould half 7A.1 and a lower mould half 7B.1.

The injection device 4 consists of a cylinder 45 the wall of which encloses substantially a cylindric chamber 41. At the wall there is attached a cylindrical hollow connection piece which acts as feeding means 42, the interior of which communicates with the chamber 41. In the inside of the chamber 41 there are means 43 having a pressure piston and a pressure rod for exerting a pressure upon an ice cream which is fed into the chamber 41 through the feeding means 42. The cylinder 45 changes gradually into a nozzle piece which is the outlet means 44 and which is provided at its end with a nozzle opening 46. The ice cream introduced into the chamber 41 through the feeding means 42 and being the starting material is squirted out upon the exertion of pressure upon it by means of the activation of the pressure piston.

The mould consisting of the mould halves 7A.1 and 7B.1 is shown in FIG. 2 in a closed condition. The two mould halves 7A.1 and 7B.1 confine a cavity 2 in the interior of the mould, the limiting surfaces of which correspond to the shape (e.g. a snake form) of the ice cream product to be produced. A conduit conically narrowing in direction towards the mould cavity 2 leads into the said cavity 2, being the intake opening 21 to which the nozzle opening 46 of the injection device is directly connected in order to form a passage for injecting the ice cream from the chamber 41 of the injection device 4 into the cavity 2 of the mould. A stick introduction opening 22 is provided in the upper mould half 7A.1, through which a longitudinal, approximately one-finger-wide ice cream stick 1 with a lower side 11 and an upper side 12 is introducible into the cavity 2 of the mould from outside of same. A pin 3 projecting into the cavity 2 of the mould is located in the lower mould half 7B.1, being the supporting means.

As shown in FIG. 2, an ice cream stick 1 is introduced through the stick introduction opening 22 into the cavity 2 of the mould, the one end of which is projecting out of the mould 7A.1, 7B.1 to the outside, and which extends with its other end relatively far into the cavity 2 of the mould. In the vicinity of said other end the stick is supported by the pin 3, said more precisely, by its conically tapering point, at a bearing location P. The stick 1 is therefore lying in the stick introduction opening 22 clamped between the mould wall of the mould halves 7A.1 and 7B.1 when the here seen closed condition of the mould is made the basis of our considerations, and additionally is borne and supported on pin 3 in the interior of the cavity 2. The intake opening 21 is located in the upper mould half 7A.1 opposite to the pin 3 which is located in the lower mould half 7B.1, the stick 1 lying with its lower side 11 upon the pin 3 and facing the intake opening 21 with its upper side 12.

The two mould halves 7A.1 and 7B.1 are equipped with a heating circuit 71 which is supplied with a heating medium through connection pieces (shown in FIG. 1 only). For venting the mould 7A.1, 7B.1 during injecting the ice cream a plurality of air vents (not shown in FIG. 2) are provided as usual. In addition, the mould 7A.1, 7B.1 is provided with centring pins and the associated openings (not shown in FIG. 2) as e.g. shown in FIG. 1.

The apparatus can be employed for carrying out the method according to the invention as follows:

The ice cream stick 1 is introduced through the stick introduction opening 22 into the mould cavity 2.

A usual ice cream formulation, consisting e.g. of water-ice, saccharose, locust bean gum and flavours is frozen to a temperature of −5° C. in a here not shown ice machine and is then introduced through the feeding means 42 into the chamber 41 to the injection device 4. The "slush" i.e. the ice cream which is obtained from the ice machine has an ice contents of approximately 50% and is pumpable.

Thereafter the pressure piston 2 of the device 43 is activated and is moved within the chamber 41 in direction to the nozzle piece of the outlet means 44 in order to exert a pressure upon the ice cream within the chamber 41 of the injection device 4 and to press it through the intake opening 21 of the mould 7A.1, 7B.1 into the cavity 2 of the closed mould. The pressure of the partly frozen ice cream within the cavity 2 amounts to at least 2 bar, preferably however 25 bar in order to increase the production output rate. During the injection event of the partly frozen ice cream, the air present within the cavity 2 of the mould can escape through vent openings which are formed in the transition part between the two mould halves 7A.1 and 7B.1 toward outside. Circulation of a heating liquid through the heating circuit 71 keeps the wall at a temperature which is just above the melting point of the ice cream.

Since the ice cream stick 1 is supported within the mould cavity 2 by the pin 3, a deflection or a bending of the ice cream stick due to the ice cream injected into the mould cavity is largely avoided. This prevents possible defect spots to be formed in the ice cream product.

After the injection of the ice cream into the mould cavity, the pressure in the chamber 41 is released, the mould halves 7A.1 and 7B.1 are separated from one another and the ice cream product is taken out.

After the mould 7A.1, 7B.1 is again closed and another stick is introduced, the apparatus is ready for the next production cycle.

After the thus shaped ice cream product is taken out of the mould, it is hardened for making it ready for storage and shipping. The hardening is carried out by conveying the ice cream product through a cooling tunnel. In order to give to the product an immediate rigidity, it may be sprayed with or dipped into liquid nitrogen.

We claim:

1. Method for producing an ice cream product, the method comprising:
   (i) introducing at least one stick partly into a cavity of a mold for shaping the ice cream product, the mold comprising walled mold sections, clamping a portion of the stick between the walled sections of the mold and a portion of the stick having a free end extending into the cavity;
   (ii) introducing an ice cream under pressure into the cavity of the mold;
   (iii) releasing thereupon the pressure; and
   (iv) removing the shaped ice cream product from the cavity;
   wherein the free end of the stick is supported within the cavity of the mold such that the portion of the stick extending into the cavity does not deflect or bend when the ice cream is introduced under pressure.

2. Method according to claim 1, wherein the at least one stick is supported at least at one spot, so that largely a mutual neutralization of torques acting on a respective stick is obtained, said torques appearing during introduction of the ice cream under pressure into the cavity of the mold.

3. Method according to claim 1, wherein said at least one stick is supported by means of a pin projecting into the cavity of the mold.

4. Method according to claim 1, wherein said at least one stick is supported by means of a plurality of pins projecting into the cavity of the mold.

5. Method according to claim 4, wherein at least one of the pins supports a respective stick on an upper side of the stick, and that at least one of the pins supports the respective stick on a lower side of the stick.

6. Method according to claim 4, wherein at least one of the pins supports the respective stick laterally.

7. Method according to claim 3, wherein the pin is conically tapering in a direction of a respective stick to be supported.

8. Method according to claim 1, wherein the ice cream has an ice content of between 45 and 75% by weight.

9. Method according to claim 1, wherein the mold is heated up to a temperature which is higher than a temperature of the ice cream, before the ice cream product is taken out of the mold.

10. Method according to claim 1, wherein the ice cream product is hardened after being taken out of the mold.

11. Method according to claim 1, wherein the ice cream being introduced into the cavity contains separate ice particles and a continuous liquid phase in such relative quantities, that the ice cream retains its form without support.

12. Method according to claim 4, wherein each of the pins is conically tapering in a direction of a respective stick to be supported.

13. Apparatus for producing ice cream products made of a starting material, the apparatus comprising:
    (i) an injection device having a chamber with feeding means for the starting material, means for exerting a pressure upon the starting material in the chamber, and outlet means for delivering the pressurized starting material; and
    (ii) a mold for shaping the starting material comprising walled mold sections which, when in closed condition, define a mold cavity to be filled with the starting material through an intake opening by means of the outlet means of the injection device, at least one stick introduction opening for introducing at least one stick into the mold cavity, a portion of the stick being clamped between the walled sections of the mold and a portion of the stick having a free end extending into the cavity, and air vents, wherein the mold is provided with supporting means in the cavity for supporting the free end of the stick such that the portion of the stick extending into the cavity does not deflect or bend when the starting material is introduced under pressure.

14. Apparatus according to claim 13, wherein the supporting means are located so that the at least one stick is supported by said supporting means at one spot, so that a mutual neutralization of torques acting on the at least one stick is obtained, said torques appearing at the at least one stick during the introduction of the starting material under pressure into the cavity of the mold.

15. Apparatus according to claim 13, wherein the supporting means is provided with at least one pin which projects into the mold cavity.

16. Apparatus according to claim 15, wherein the at least one pin supports a respective stick on an upper side of the stick, and that another of the at least one of the pins supports the respective stick on a lower side of the stick.

17. Apparatus according to claim 15, wherein the at least one pin supports a respective stick laterally.

18. Apparatus according to claim 15, wherein the at least one pin is conically tapering in a direction of the respective stick to be supported.

19. Apparatus according to claim 13, wherein means are provided for producing an ice cream as starting material of ice particles and a continuing liquid phase.

20. Apparatus according to claim 13, wherein the mold is provided with a heating device.

21. Apparatus according to claim 15, wherein the intake opening is formed in a mold wall of the mold opposite to a point of the pin.

* * * * *